United States Patent
Oveyssi

(10) Patent No.: US 6,741,428 B1
(45) Date of Patent: May 25, 2004

(54) SPINDLE MOTOR HAVING INNER AND OUTER BALL BEARING SETS

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 193 days.

(21) Appl. No.: 09/823,743

(22) Filed: Mar. 30, 2001

(51) Int. Cl.[7] .............................................. G11B 21/08
(52) U.S. Cl. .................................................... 360/265.6
(58) Field of Search ......................... 360/265.6, 99.08; 384/490, 499, 504; 310/156.08

(56) References Cited

U.S. PATENT DOCUMENTS

| | | | | |
|---|---|---|---|---|
| 2,647,807 A | * | 8/1953 | Brunstrum | 384/461 |
| 3,737,202 A | * | 6/1973 | Rosales | 384/461 |
| 5,138,477 A | * | 8/1992 | Omura et al. | 359/200 |
| 5,228,845 A | * | 7/1993 | Steele | 418/55.1 |
| 5,942,820 A | * | 8/1999 | Yoshida | 310/67 R |
| 6,115,213 A | | 9/2000 | Ikeda et al. | 360/99.08 |
| 6,196,725 B1 | * | 3/2001 | Brown | 384/461 |

* cited by examiner

*Primary Examiner*—David Davis
(74) *Attorney, Agent, or Firm*—Won Tae C. Kim, Esq.; Milad G. Shara, Esq.; Stetina Brunda Garred & Brucker

(57) ABSTRACT

A spindle motor for use in a disk drive includes a spindle motor base. The spindle motor further has a spindle motor hub rotatably attached to the spindle motor base. The spindle motor further has a motor shaft in mechanical conmmunication with the spindle motor base. The spindle motor further has an inner ball bearing set surrounding the motor shaft. The inner ball bearing set has a first inner race and a first outer race. The first inner race is attached to the motor shaft. The spindle motor has an outer ball bearing set surrounding the inner ball bearing set. The outer ball bearing set has a second inner race and a second outer race. The second inner race is fixed relative to the first outer race.

20 Claims, 3 Drawing Sheets

SPINDLE MOTOR HAVING INNER AND OUTER BALL BEARING SETS

CROSS-REFERENCE TO RELATED APPLICATIONS

Not Applicable

BACKGROUND OF THE INVENTION

1. Field of the Invention

The present invention relates generally to disk drive spindle motors, and more particularly to a spindle motor having inner and outer ball bearing sets.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from the disk. The printed circuit board assembly includes a servo control system in the form of a disk controller for generating servo control signals. The heads stack assembly is controllably positioned in response to the generated servo control signals from the disk controller. In so doing, the attached heads are moved relative to tracks disposed upon the disk.

The spindle motor typically includes a spindle motor base, a central shaft, a rotatable hub, a stator, a magnet attached to the hub, and vertically spaced upper and lower ball bearing sets mounted upon the central shaft which facilitate rotational attachment of the hub to the spindle motor base. Each ball bearing set includes inner and outer ball bearing races which encase a plurality of ball bearings. The inner ball bearing races engage the central shaft and the outer ball bearing races engage the hub. This configuration allows for rotational movement of the outer ball bearing races relative to the inner ball bearing races for rotation of the hub. The hub further includes an outer flange which is used to support one or more of the disks. The upper and lower ball bearing sets are pre-loaded in compression to maintain the hub, and the disks supported on the hub, in an orthogonal configuration with respect to the shaft. The stator includes a series of coils and is concentrically positioned about the shaft, adjacent the hub. With this general configuration, the various coils of the stator are selectively energized to form an electromagnetic field that pulls/pushes on the magnet otherwise associated with the hub, thereby imparting a rotational motion onto the hub. Rotation of the hub results in the rotation of the attached disks.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties. As such reduced sized disk drives may have applications in hand held or mobile electronic device, the specifications may be even be tighter as compared to personal computer applications. For example, those specifications related to susceptibility to damage resulting from shock.

One particular area of focus is the reduction of the height of the spindle motor. In a typical configuration, the spindle motor height may be a function of the upper and lower ball bearing set arrangement. The mere reduction of the sizing of the upper and lower ball bearing sets impacts the susceptibility to damage resulting from shock, potential use of non-standard form factor bearing sets, and difficulties in conforming to allotted space requirements for such bearings. Accordingly, there is a need in the art for an improved spindle motor ball bearing configuration in comparison to the prior art.

SUMMARY OF THE INVENTION

An aspect of the invention can be regarded as a spindle motor for use in a disk drive. The spindle motor is provided with a spindle motor base. The spindle motor is further provided with a spindle motor hub rotatably attached to the spindle motor base. The spindle motor is further provided with a motor shaft in mechanical communication with the spindle motor base. The spindle motor is further provided with an inner ball bearing set surrounding the motor shaft. The inner ball bearing set has a first inner race and a first outer race. The first inner race is attached to the motor shaft. The spindle motor is further provided with an outer ball bearing set surrounding the inner ball bearing set. The outer ball bearing set has a second inner race and a second outer race. The second inner race is fixed relative to the first outer race.

Preferably, the inner and outer ball bearing sets are pre-loaded in compression. The first inner race may be axially off-set from the first outer race, and the second inner race may be axially off-set from the second outer race. The second inner race may be attached to the first outer race. Further, the outer ball bearing set may have a cross sectional size different than a cross sectional size of the inner ball bearing set.

In an embodiment of the present invention, the motor shaft is attached to the spindle motor hub. Thus, in this embodiment, the motor shaft is rotatable. The spindle motor hub has a hub annular member extending from the spindle motor hub, and the spindle motor hub is attached to the second outer race. The hub annular member is attached to the second outer race. The spindle motor base has a base annular member extending from the spindle motor base, and the base annular member is attached to the first outer race and the second inner race.

In another embodiment of the present invention, motor shaft is attached to the spindle motor base. Thus, in this embodiment, the motor shaft is stationary. The spindle motor base has a base annular member extending from the spindle motor, and the base annular member is attached to the second outer race. The spindle motor hub has a hub annular member extending from the spindle motor hub, and the hub annular member is attached to the first outer race and the second inner race.

In addition, according to another aspect of the present invention, there is provided a disk drive which includes a disk drive base and a spindle motor according to an above described embodiment. The spindle motor base attached to the disk drive base. The spindle motor base may be integrally formed with the disk drive base.

DESCRIPTION OF THE PREFERRED EMBODIMENTS

Figure 1:
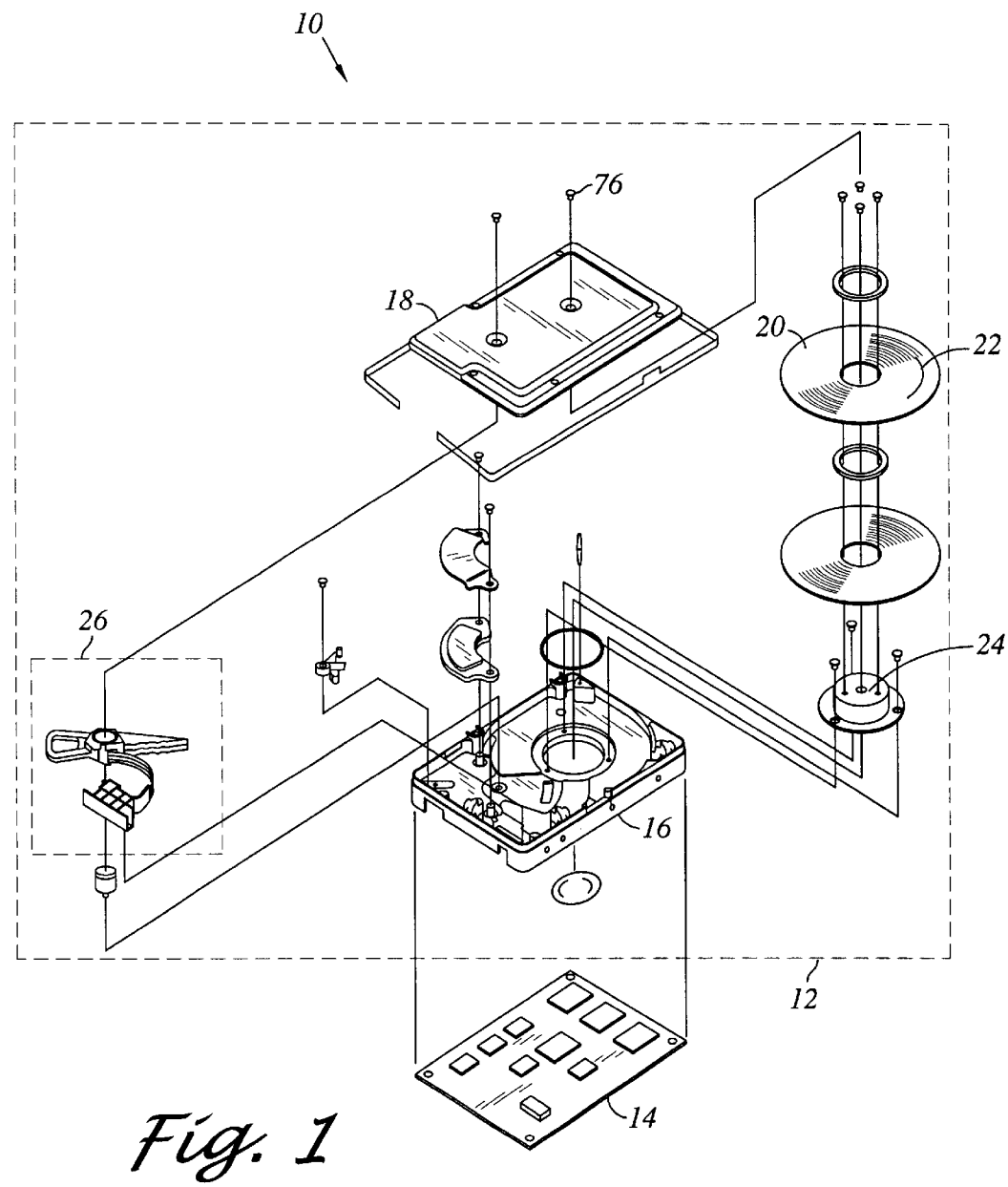
FIG. 1 is an exploded perspective view of a disk drive including a spindle motor as constructed in accordance with an aspect of the present invention.

Referring now to the drawings wherein the showings are for purposes of illustrating preferred embodiments of the present invention only, and not for purposes of limiting the same, FIGS. 1–6 illustrate a disk drive 10 and spindle motor 12 in accordance with the aspects of the present invention.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house at least one magnetic disk 20 (two disks 20 are shown). The disks 20 contain a plurality of tracks 22 for reading and writing data. The head disk assembly 12 further includes a spindle motor 24 for rotating the disks 20 and a head stack assembly 26.

Figure 2:
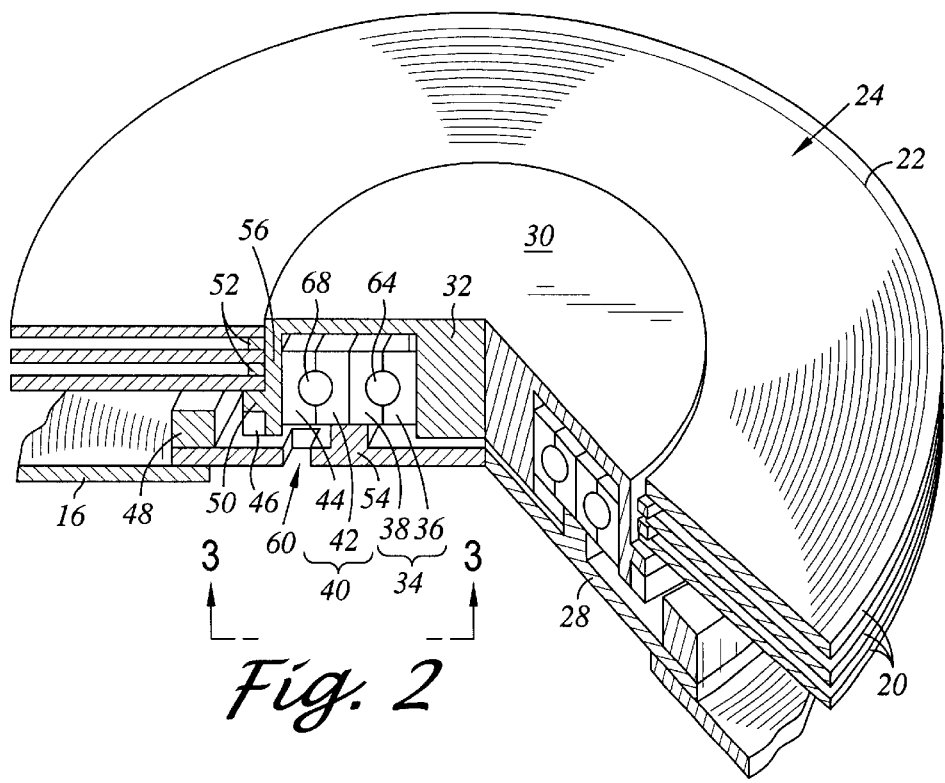
FIG. 2 is an exposed perspective view of a disk stack assembly including a spindle motor having inner and outer ball bearing sets and a motor shaft attached to a spindle motor hub as constructed in accordance with an embodiment of the present invention.
Figure 3:
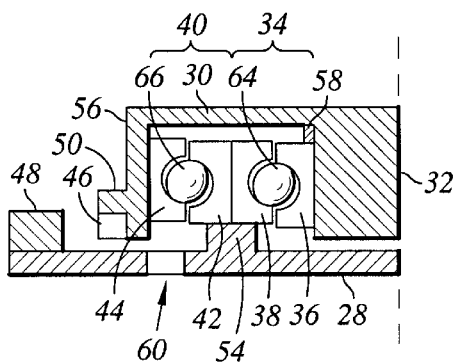
FIG. 3 is a cross sectional view of a portion of the spindle motor of FIG. 2 as seen along axis 3—3.

Referring now to FIG. 2, there is depicted an exposed perspective view of a spindle motor 24 as constructed in accordance with an embodiment of the present invention. FIG. 3 is a cross sectional view of a portion of the spindle motor 24 of FIG. 2 as seen along axis 3—3. The spindle motor 24 is provided with a spindle motor base 28. The spindle motor 24 is further provided with a spindle motor hub 30 rotatably attached to the spindle motor base 28. The spindle motor 24 is further provided with a motor shaft 32 disposed in mechanical communication with the spindle motor base 28. The spindle motor 24 is further provided with an inner ball bearing set 34 surrounding the motor shaft 32. The inner ball bearing set 34 has a first inner race 36 and a first outer race 38. The first inner race 36 is attached to the motor shaft 32. The spindle motor 24 is further provided with an outer ball bearing set 40 surrounding the inner ball bearing set 34. The outer ball bearing set 40 has a second inner race 42 and a second outer race 44. The second inner race 42 is fixed relative to the first outer race 38.

In further detail according to an embodiment of the present invention, the spindle motor 24 is provided with a stator 48 mounted upon the spindle motor base 28 about the spindle motor hub 30. The stator 48 includes a series of coils. The spindle motor hub 30 includes a magnet 46 disposed about its periphery. In this regard, the spindle motor hub 30 may include a hub annular member 56. The magnet 46 is outwardly attached to the hub annular member 56. The spindle motor hub 30 may further include a hub flange 50 and the magnet 46 may be seated under and against the hub flange 50. The hub flange 50 may additionally serve as support for the disks 20. Annular spacers 52 may be interleaved between the disks 20. The magnet 46 is positioned adjacent the stator 48. With this general configuration, the various coils of the stator 48 are selectively energized to form an electromagnetic that pulls/pushes on the magnet 46 otherwise associated with the spindle motor hub, 30 thereby imparting a rotational motion onto the spindle motor hub 30. Rotation of the spindle motor hub 30 results in the rotation of the attached disks 20.

As mentioned above, the inner ball bearing set 34 has a first inner race 36 and a first outer race 38. The first inner race 36 and first outer race 38 cooperatively encase a plurality of inner ball bearings 64. Similarly, the outer ball bearing set 40 has a second inner race 42 and a second outer race 44 which cooperatively encase a plurality of outer ball bearings 66.

According to such embodiment depicted in FIGS. 2 and 3, the motor shaft 32 is attached to the spindle motor hub 30. Thus, the motor shaft 32 is rotatable. The first inner race 36 is attached to the motor shaft 32. The spindle motor base 28 has a base annular member 54 extending from the spindle motor base 28. The base annular member 54 is attached to the first outer race 38 and the second inner race 42. The first outer race 38 and the second inner race 42 may be attached to each other. Further, the hub annular member 56 is attached to the second outer race 44. As such, as the first outer race 38 and the second inner race 42 are attached to the base annular member 54, the first outer race 38 and the second inner race 42 are relatively stationary. In contrast, as the first inner race 36 and the second outer race 44 are respectively attached to the motor shaft 32 and the hub annular member 56, the first inner race 36 and the second outer race 44 are rotatable with rotation of the spindle motor hub 30.

The inner and outer ball bearing sets 34, 40 are preferably pre-loaded in compression. Referring now specifically to the cross sectional view of FIG. 3, the first inner race 36 is off-set from the first outer race 38 with the ball bearings 64 disposed in compression. A race seating member 58 may be installed within the spindle motor hub 30 about the motor shaft 32 for supporting and positioning of the first inner race 36 axially along the motor shaft 32. The second inner race 42 is off-set from the second outer race 44 with the outer ball bearings 66 disposed in compression. The spindle motor base 28 may be provided with a base access opening 60, as also depicted in FIG. 2. The base access opening 60 allows for access to the second outer race 44 during installation for positioning the second outer race 44 for attachment to the hub annular member 56 with the outer ball bearings 66 in compression. As such, the second outer race 44 may be attached to the hub annular member 56 with an adhesive and tooling may be provided to impart force against the second outer race 44 during setting of the adhesive. It is contemplated that other pre-loading geometric configurations of the inner and outer ball bearing sets 34, 40 may be utilized. As such, the race seating member 58 for example may be disposed at the lower end of the first inner race 36 and access to the second outer race 44 may be via the spindle motor hub 30.

Figure 4:
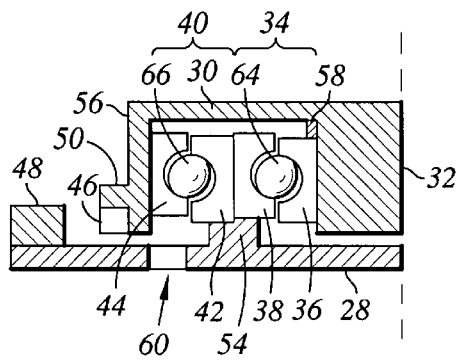
FIG. 4 is a cross sectional view similar to that of FIG. 3 of a portion of a spindle motor according to another embodiment of the present invention with a first outer race being axially off-set from a second inner race.

Referring now to FIG. 4, there is depicted another embodiment of the present invention. In particular, the base annular member 54 is stepped to vertically off-set the first outer race 38 with respect to the second inner race 42. Such stepped nature of the base annular member 54 is contemplated to facilitate seating and positioning of the first outer race 38 and the second inner race 42.

Figure 5:
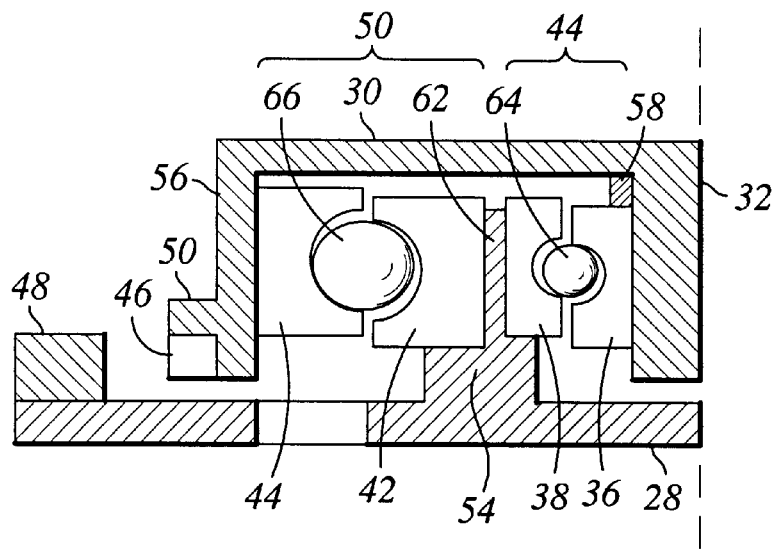
FIG. 5 is a cross sectional view similar to that of FIG. 3 of a portion of a spindle motor according to another embodiment of the present invention with a first outer race being separated from a second inner race by a race support.

Referring now to FIG. 5, there is depicted another embodiment of the present invention. In particular, the base annular member 54 may be provided with a vertical race support 62. The vertical race support 62 extends between the first outer race 38 and the second inner race 42 to facilitate seating and positioning of the first outer race 38 and the second inner race 42. As additionally illustrated in FIG. 5, the inner and outer ball bearing sets 34, 40 may be of differing sizes. For example, the outer ball bearing set 40 may be sized greater than the inner ball bearing set 34. In addition, the inner and outer ball bearing sets 34, 40 may have differing number of ball bearings 64, 66.

Figure 6:
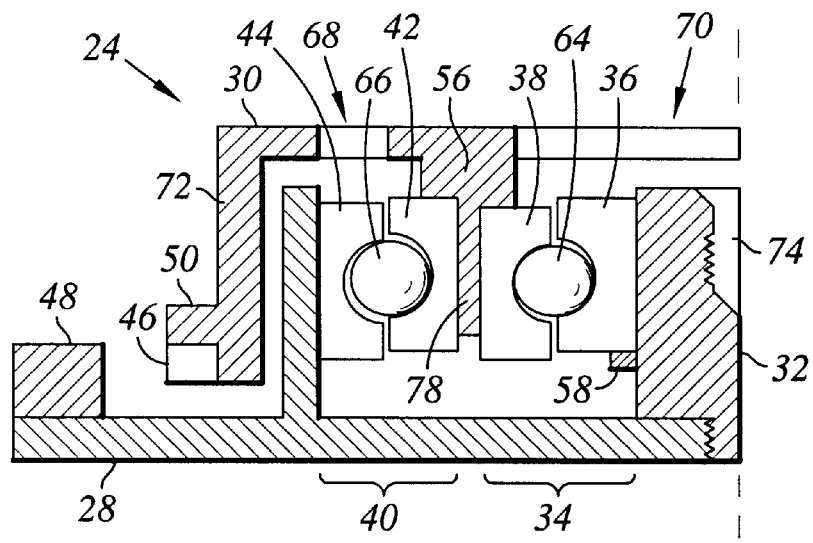
FIG. 6 is a cross sectional view similar to that of FIG. 3 of a portion of a spindle motor according to another embodiment of the present invention with a motor shaft attached to a spindle motor base.

Referring now to FIG. 6, there is depicted yet another embodiment of the present invention. In this embodiment, the motor shaft 32 is attached to the spindle motor base 28. Thus, the motor shaft 32 is relatively stationary. Further, the hub annular member 56 is attached to the first outer race 38 and the second inner race 42. The hub annular member 56 may be modified to provide various seating geometries for the first outer race 38 and the second inner race 42 with respect to each other (similar to those of the base annular member 54 of the embodiments shown in FIGS. 3–5). In this regard, the embodiment depicted in FIG. 6 has an analogous race seating geometry for the first outer race 38 and second inner race 42 as depicted in FIG. 5. As such, the hub annular member 56 may be provided with a vertical race support 78. The base annular member 54 is attached to the second outer race 44. The spindle motor hub 30 may further be provided with a disk support 72 which may include the hub flange 50 and magnet 46. Hub race access openings 68 may be formed in the spindle motor hub 30 for allowing access to the inner and outer ball bearing sets 34, 40, and in particular the second outer race 44 in the embodiment depicted, for pre-loading installation. The hub race access openings 68 may take the form of selectively distributed holes formed in the spindle motor hub 30. A hub shaft access opening 70 may be formed in the spindle motor hub 30 for providing access to the motor shaft 32. The hub shaft access opening 70 may be formed from a ring cut. The motor shaft 32 may be provided with a screw hole 74 for receiving a screw 76 for attaching the motor shaft 32 with the cover 18.

I claim:

1. A spindle motor for use in a disk drive, the spindle motor comprising:
   a spindle motor base;
   a spindle motor hub rotatably attached to the spindle motor base;
   a motor shaft in mechanical communication with the spindle motor base;
   a single inner ball bearing set surrounding the motor shaft, the inner ball bearing set having a first inner race and a first outer race; and
   a single outer ball bearing set surrounding the inner ball bearing set, the outer ball bearing set having a second inner race and a second outer race, the first outer race and the second inner race are attached to the spindle motor base, the first inner race is attached to the motor shaft and the second outer race is attached to the spindle motor hub.

2. The spindle motor of claim 1 wherein the inner and outer ball bearing sets are pre-loaded in compression.

3. The spindle motor of claim 2 wherein the first inner race is axially off-set from the first outer race, the second inner race is axially off-set from the second outer race.

4. The spindle motor of claim 1 wherein the second inner race is attached to the first outer race.

5. The spindle motor of claim 1 wherein the outer ball bearing set has a cross sectional size different than a cross sectional size of the inner ball bearing set.

6. The spindle motor of claim 1 wherein the motor shaft is attached to the spindle motor hub.

7. The spindle motor of claim 1 wherein the spindle motor hub has a hub annular member extending from the spindle motor hub.

8. The spindle motor of claim 1 wherein the spindle motor base has a base annular member extending from the spindle motor base.

9. The spindle motor of claim 1 wherein the motor shaft is attached to the spindle motor hub, the spindle motor hub has a hub annular member extending from the spindle motor hub, the hub annular member is attached to the second outer race, the spindle motor base has a base annular member extending from the spindle motor base, the base annular member is attached to the first outer race and the second inner race.

10. A disk drive comprising:
    a disk drive base;
    a spindle motor comprising:
        a spindle motor base attached to the disk drive base;
        a spindle motor hub rotatably attached to the spindle motor base;
        a motor shaft in mechanical communication with the spindle motor base;
        a single inner ball bearing set surrounding the motor shaft, the inner ball bearing set having a first inner race and a first outer race; and
        a single outer ball bearing set surrounding the inner ball bearing set, the outer ball bearing set having a second inner race and a second outer race, the first outer race and the second inner race are attached to the spindle motor base, the first inner race is attached to the motor shaft and the second outer race is attached to the spindle motor hub.

11. The disk drive of claim 10 wherein the spindle motor base is integrally formed with the disk drive base.

12. The disk drive of claim 10 wherein the inner and outer ball bearing sets are pre-loaded in compression.

13. The disk drive of claim 12 wherein the first inner race is axially off-set from the first outer race, the second inner race is axially off-set from the second outer race.

14. The disk drive of claim 10 wherein the second inner race is attached to the first outer race.

15. The disk drive of claim 10 wherein the outer ball bearing set has a cross sectional size different than a cross sectional size of the inner ball bearing set.

16. The disk drive of claim 10 wherein the motor shaft is attached to the spindle motor hub.

17. The disk drive of claim 10 wherein the spindle motor hub has a hub annular member extending from the spindle motor hub.

18. The disk drive of claim 10 wherein the spindle motor base has a base annular member extending from the spindle motor base.

19. The disk drive of claim 10 wherein the motor shaft is attached to the spindle motor hub, the spindle motor hub has a hub annular member extending from the spindle motor hub, the hub annular member is attached to the second outer race, the spindle motor base has a base annular member extending from the spindle motor base, the base annular member is attached to the first outer race and the second inner race.

20. A spindle motor for use in a disk drive, the spindle motor comprising:

a spindle motor base;

a spindle motor hub rotatably attached to the spindle motor base;

a fixed motor shaft in mechanical communication with the spindle motor base;

a single inner ball bearing set surrounding the fixed motor shaft, the inner ball bearing set having a first inner race and a first outer race; and a single outer ball bearing set surrounding the inner ball bearing set, the outer ball bearing set having a second inner race and a second outer race;

wherein the first inner race is attached to the fixed motor shaft, the second outer race is attached to the spindle motor base and the first outer race and the second inner race are attached to the spindle motor hub.

* * * * *